A. H. MILLER & L. M. WATKIN, Jr.
ANTIFRICTION BEARING.
APPLICATION FILED DEC. 19, 1916.

1,247,859.

Patented Nov. 27, 1917.

INVENTORS
Alfred H. Miller and
Lewis M. Watkin Jr
By J. W. Ellis
ATTORNEY

UNITED STATES PATENT OFFICE.

ALFRED H. MILLER AND LEWIS M. WATKIN, JR., OF PHILADELPHIA, PENNSYLVANIA.

ANTIFRICTION-BEARING.

1,247,859. Specification of Letters Patent. Patented Nov. 27, 1917.

Application filed December 19, 1916. Serial No. 137,839.

*To all whom it may concern:*

Be it known that we, ALFRED H. MILLER and LEWIS M. WATKIN, Jr., citizens of the United States of America, and residents of the city of Philadelphia, county of Philadelphia, and State of Pennsylvania, have invented certain new and useful Improvements in Antifriction-Bearings, of which the following is a full, clear, and exact description.

Our invention relates generally to antifriction bearings and in particular to that type of bearing in which tapered rollers are employed.

It is well known to those skilled in the art that in the manufacture of bearings of this type, in some cases, loose parts are provided on the bearings, which become misplaced, and in cases where the parts are shrunk together a good deal of waste material results because of the inaccuracies resulting from the scaling of the metal when heated.

The principal object of our invention has been to overcome these disadvantages and to provide a bearing which shall greatly reduce the cost of manufacture and also reduce the waste material.

Moreover, we have sought to provide a bearing which shall be very simple to manufacture and one in which it will be impossible for the parts to get out of order or adjustment.

Furthermore, our bearing is so constructed that the retainer rings thereof are made an integral part of the bearing and thus all removable or screw-threaded retainer rings are dispensed with.

Moreover, we have sought to provide a bearing, the cones and retainer rings of which shall be made of pressed steel.

We have also sought to provide a bearing which shall be standardized for a given load and so constructed that it may be easily and quickly adapted to different sized shafts and wheel hubs.

The above objects and advantages have been accomplished by the device shown in the accompanying drawings.

Figure 1:
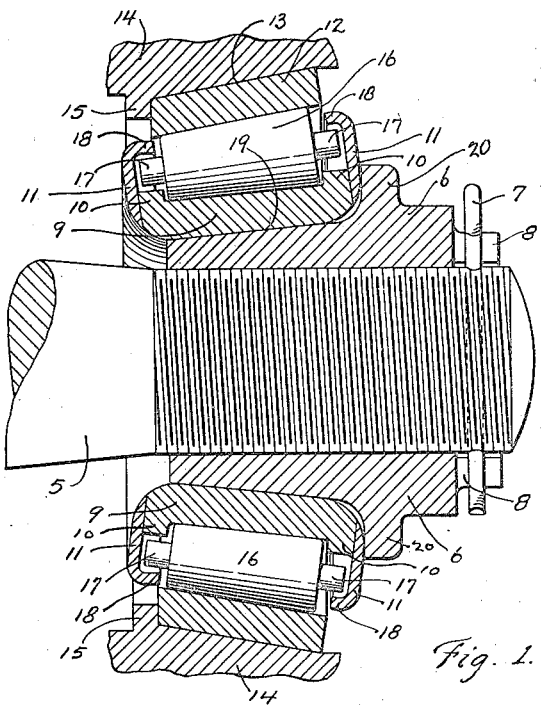
Figure 1 is a sectional elevation of our complete bearing.

In the drawings, 5 represents the shaft on which our bearing is mounted. The outer end of this shaft is screw-threaded and arranged thereon is an adapter nut 6. This nut is provided with screw-threads which fit the screw-threads on the shaft 5, and, after it has been moved to the desired position, a cotter-pin may be passed through the end of the shaft and through slots 8 provided in the outer end of the nut.

9 is the inner bearing cone of our device which preferably is formed of pressed steel and has its ends 10 upturned as shown in the drawings. The outer faces of these cones are preferably finished and a retainer ring 11 is fitted to each face and secured thereto by means of electric spot welding. 12 is the outer bearing cone which is also formed of pressed steel.

16 are the tapered rollers of our bearing which are each provided at each end with a retainer pin 17. These pins project outwardly, and beneath the inwardly extending lips 18 of the retainer rings 11, thus preventing their displacement when the bearing is being handled.

Since the cones of our bearings are formed of pressed steel of uniform thickness, the inner bore of the inner cone 9 and the outer periphery of the outer cone 12 will be tapered. In order to adapt our bearing to cylindrical shafts the adapter nut 6 is employed and it is provided with a tapered outer periphery 19 which fits the inner bore of the inner cone. A shoulder 20 is also preferably provided upon this adapter nut and it is arranged to bear against the outer face of the larger retainer ring 11. In Fig. 1, the bore 13 of the wheel hub 14 is tapered to fit the outside tapered diameter of the cone 12 and is preferably provided with a shoulder 15.

Figure 2:
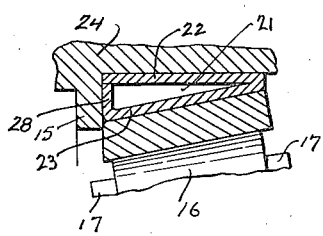
Fig. 2 is a fragmentary, sectional view of our device adapted to a wheel hub of a modified form.

When, however, our bearing is to be used in wheel hubs which have a parallel bore, it is convenient to provide a tapered bushing 21, shown in Fig. 2. This bushing, which is preferably formed of pressed steel, has the part 22, forming the outside diameter, cylindrical in shape and of a diameter to fit the bore of the wheel hub 24. The part 23 of the material is then bent inwardly nearly upon itself, and formed with an inner tapered bore corresponding to the taper of the outer bearing cone 12. The outer end 28 of the part 23 is bent upwardly and has its end face bearing against the inner face of the part 22, whereby a strut is provided, which sustains the part 23 in spaced relations with the part 22, thus maintaining the angle of disposition of the part 23.

Figure 3:
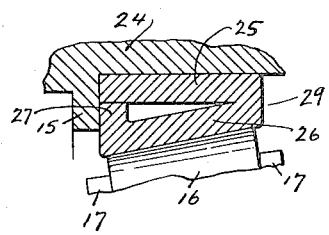
Fig. 3 is a fragmentary, sectional view of a modification of our device.

In the form of our device shown in Fig. 3, the outer bearing cone 29 is made of sheet metal which is so shaped as to provide a tapered roller tread for the rollers, and a cylindrical outer periphery to fit wheel hubs having a cylindrical bore. The part 25 forming the outer periphery of this cone, is cylindrical. The material is now bent downwardly and inwardly and folded upon itself sufficiently to form the tapered tread part 26. The inner end 27 of this part is bent upwardly so as to be in contact with the under face of the part 25, thus providing a strut to keep the part 26 in its proper tapered relation to the part 25.

When our bearing is constructed, one of the retainer rings 11 is secured to one end of inner bearing cone 9 preferably by electric spot welding. The rollers 16 are now placed around the inner bearing cone and the other retainer ring placed in position against the other end of the cone 9 and secured thereto by electric spot welding. Thus it will be seen that our bearing is made in substantially a unitary construction and has no parts to become loose or misplaced.

A slight grinding operation on the bearing faces of the cones is the only operation necessary to be performed upon these bearing cones.

Due to the employment of the adapter nut 6, it is possible for us to standardize our bearing, and thus be able to stock a great number of them and to adapt them to different sized shafts, making the bore of the nut to fit the case in hand. The bushing 21 may also be made of different sizes so as to easily adapt the bearing to different sized wheel hubs.

Obviously some modification of the details herein shown and described may be made without departing from the spirit of our invention or the scope of the appended claims, and we do not, therefore, wish to be limited to the exact embodiment therein shown and described.

Having thus described our invention, what we claim is:

1. An antifriction bearing comprising an inner bearing cone and an outer bearing cone, tapered rollers disposed between said bearing cones and retainer rings rigidly secured to the end faces of one of said cones by spot welding.

2. An antifriction bearing comprising an inner bearing cone and an outer bearing cone, said cones being of uniform thickness, tapered rollers disposed between said bearing cones and retainer rings rigidly secured to the end faces of one of said cones by spot welding.

3. An antifriction bearing comprising an inner bearing cone and an outer bearing cone, tapered rollers disposed between said bearing cones, said inner cone having its ends upturned and retainer rings rigidly secured to the end faces of said inner cone by spot welding.

4. An antifriction bearing comprising an inner bearing cone and an outer bearing cone, said cones being of uniform thickness, tapered rollers disposed between said bearing cones, retainer rings rigidly secured to the end faces of one of said cones, and an adapter nut having a tapered periphery and arranged to engage said inner cone.

5. An antifriction bearing comprising an inner bearing cone and an outer bearing cone, said cones being of uniform thickness, tapered rollers disposed between said bearing cones, a tapered bushing engageable with the said outer cone, and retainer rings rigidly secured to the end faces of one of said cones by spot welding.

6. An antifriction bearing comprising an inner bearing cone and an outer bearing cone, said cones being of uniform thickness, tapered rollers disposed between said bearing cones, a tapered adapter nut engageable with said inner cone, a tapered bushing engageable with said outer cone, and retainer rings rigidly secured to the end faces of said cones.

In testimony whereof, we have hereunto signed our names.

ALFRED H. MILLER.
LEWIS M. WATKIN, Jr.